Jan. 10, 1928.
M. HARRIS
1,656,148
ARTIFICIAL CHRISTMAS TREE
Filed April 5, 1926
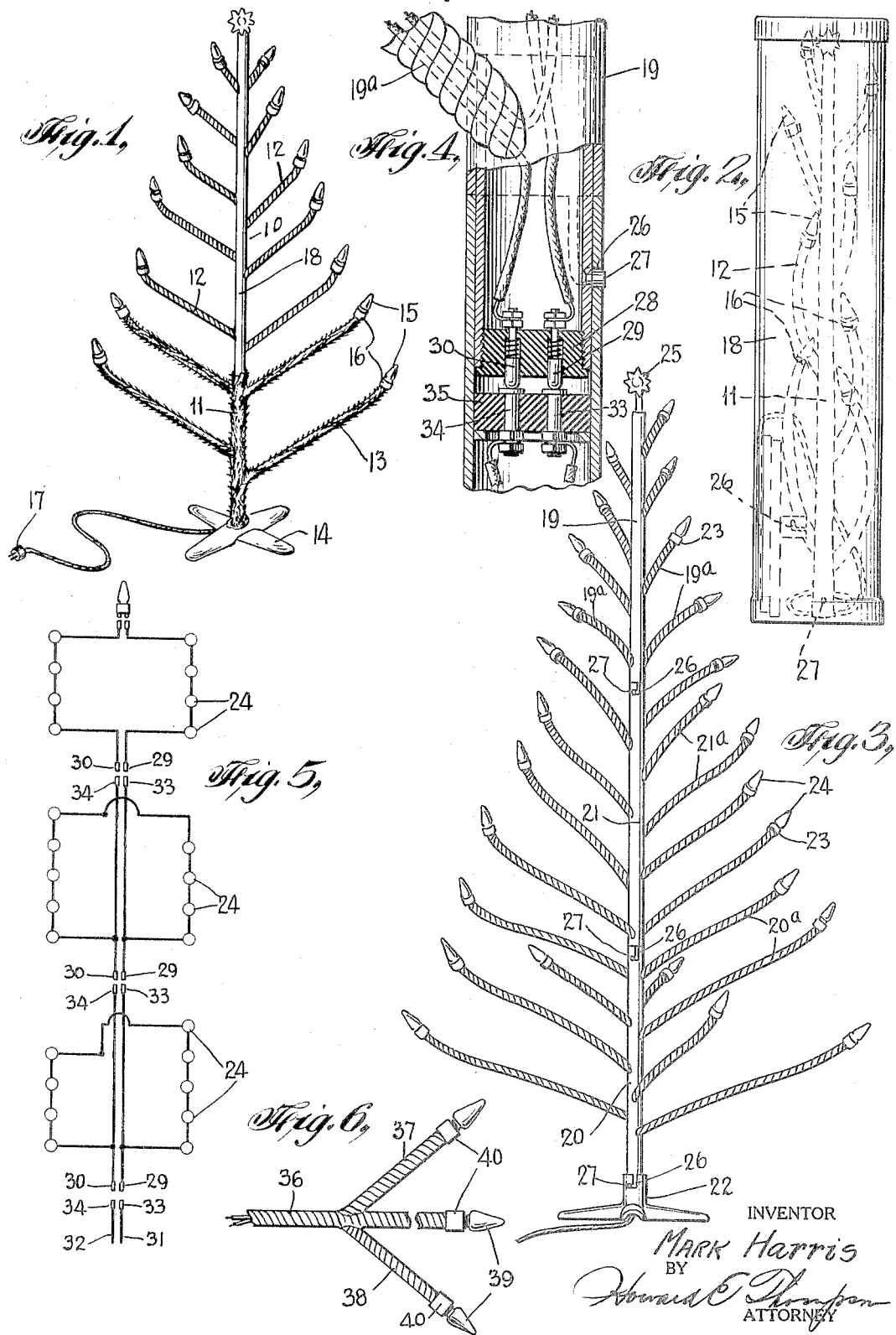
INVENTOR
MARK Harris
BY
ATTORNEY Patented Jan. 10, 1928.

1,656,148

UNITED STATES PATENT OFFICE.

MARK HARRIS, OF NEW ROCHELLE, NEW YORK.

ARTIFICIAL CHRISTMAS TREE.

Application filed April 5, 1926. Serial No. 99,783.

This invention relates to artificial Christmas trees and the object of the invention is to provide a tree of the class specified, comprising a trunk portion and a plurality of branches mounted in connection with the trunk portion and movable relatively thereto, said branches being composed of flexible material whereby the same can be moved into collapsed and extended position, and particularly a tree of the class specified composed of two or more sections with means for coupling the same together and to a supporting base or stand in a manner to form a variable size tree; a still further object being to provide a tree of the class specified containing one or more electric circuits for Christmas tree lights, as for example a light circuit for each section with means for placing a light unit of one section in electrical communication with a light unit of an adjacent section; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a side view of a small tree made in accordance with my invention, constituting one unit or section, with parts of the construction broken away;

Fig. 2 is a side view of a container indicating in dotted lines the tree shown in Fig. 1 supported in the container in its collapsed position and illustrating the several parts of the device;

Fig. 3 is a view similar to Fig. 1 but showing the tree composed of a plurality of sections coupled together;

Fig. 4 is a sectional detail view of an electric coupling and tree section coupling which I employ in the construction shown in Fig. 3 of the drawing.

Fig. 5 is a diagrammatic wiring diagram of the several Christmas tree light units employed in the construction shown in Fig. 3 of the drawing; and, Fig. 6 is a detail view of a modified form of branch construction which I may employ.

In Fig. 1 of the drawing I have shown a single comparatively small artificial Christmas tree comprising a main trunk frame 10, consisting of a tube having a covering 11 to artificially represent the bark of a Christmas tree, and at 12 I have shown a number of branches extending from the trunk 10 in irregular and spaced relation, said branches being secured to the trunk 10 in any desired manner and being preferably composed of flexible tubes or cables whereby the same may be extended as shown in Fig. 1 and collapsed, as indicated in Fig. 2 of the drawing in the storage or shipment of the tree, and the branches 12 are also covered by a suitable imitation fir or Christmas tree branch construction 13 to represent as near as possible the natural tree, and at 14 I have shown a base upon which the main frame or trunk 10 is adapted to be supported.

Employed in connection with the Christmas tree shown in Fig. 1 and constituting a part thereof is a Christmas tree light circuit consisting, in the construction shown, of nine sockets or nine Christmas tree bulbs or tubes 15, the socket 16 constituting an integral part of the ends of the branches 12 or being fixedly secured thereto, and the circuit wires from a plug 17 extend through the trunk 10 and branches 12 in the separate sockets 16 as will be apparent. It will be understood that the series of lights 15 may be eight or nine, or any other desired number, as is the common practice but in the present construction the circuit or circuits employed constitute the integral part of the tree construction. The electric light bulbs or tubes 15 only are detachable for replacement.

In Fig. 2 of the drawing I have shown at 18 a container or shipping case which will be of such dimensions as to receive the Christmas tree when in collapsed position, as indicated in dotted lines in said figure, whereby the tree may be packed away when not in use for storage, and this case also facilitates the packing or shipping of the Christmas tree.

In Fig. 3 of the drawing I have shown a modification in which a comparatively tall Christmas tree is constructed from three tree sections, namely, a top section 19, a bottom section 20 and an intermediate section 21, and it will be noted that the trunk of the sections 21 and 20 are of the same diameter thereby permitting the use of two sections 19 and 21 in connection with the base 22, if desired, it being also understood that a greater number of sections, than three, may be employed. In the construction shown in said figure each of the tree sections is provided with a plurality of flexible branches 19ª, 20ª and 21ª similar to the branches 12 shown in Fig. 1 of the drawings and composed of flexible tubings, one of said tubings, the tubing 19ª being shown on an enlarged scale in Fig. 4 of the drawing, and all of said flexible branches are provided at their ends with sockets 23 for electric light bulbs or tubes 24, and the top section 19 is provided at its upper end with a fixed star representation 25 in which one of the bulbs is mounted.

From the foregoing it will be apparent that the lower end portion of the top section 19 is of the same dimensions as the lower end portions of the intermediate and bottom sections 21—20, whereby either one of said sections, separately, can be mounted in connection with the base 22 or any number of said sections may be coupled together, and in Fig. 4 of the drawing I have shown in detail one method of coupling the separate section to each other, or to the base and the method of placing the several electric circuits in communication, which consists in providing the upper ends of the sections 20 and 21 and the base 22 with bayonet slots 26, and the lower ends of the sections 19, 21 and 20 with projecting pins 27 for engagement with the bayonet slots 26 for coupling and interlocking the separate sections, one with the other and one of the sections with the base 22.

Supported in the lower end of each section 19, 21 and 20 is a plug 28 of insulating material in which is mounted two spring contacts 29 and 30 with which the circuit wires 31 and 32 from a source of electrical supply are adapted to be electrically coupled through terminals 33 and 34 in plugs 35 mounted in the upper ends of the sections 21 and 20, and in the base or stand 22, whereby electric current from the wires 31 and 32 may be directly supplied to the Christmas tree light units or circuits of each tree section or unit, it being apparent on a consideration of Fig. 5 that the current from the wire 31 passes directly to the circuit in the top section 19 through the contacts and terminals 29 and 33 in each section, and the contacts and terminals 30 and 34 in said section and each Christmas tree light unit is independent of the other, and the wires of said units extend through the light bulbs 24 in the usual manner.

It will be understood that the tree shown in Fig. 3, or the separate sections thereof, will be covered or ornamented in the manner such as described in connection with the illustration of Fig. 1 of the drawing, or the main trunk and stem portions of the tree may be characterized in any desired manner to represent as near as possible the natural tree. It will also be apparent that other or plain branches of flexible material may be included in the tree construction in Fig. 1 of the drawing and similar branches to these may be included in the structure shown in Fig. 3 of the drawing. By plain branches I mean branches which do not include the circuit wires and the electric bulbs as do the branches 12.

In Fig. 6 of the drawing I have shown another modification wherein a branch 36 extending from the trunk of the tree is provided with sub or diverging branches 37 and 38, whereby a number of Christmas tree lights or bulbs 39 may be mounted in connection with sockets 40 at the end of the main branch 36 and the diverging branches 37 and 38, it being preferred that the ends of the diverging branches 37 and 38 terminate inwardly in the end of the main branch for illuminating the inner part or body of the tree, in addition to the extremities thereof.

In the foregoing it will be apparent that the branch construction of the tree, as seen in either Figs. 1 or 3 of the drawing, may be reproduced as naturally as the real tree, and while I have shown certain details of construction for carrying my invention into effect, it will be apparent that I am not necessarily limited thereto, and various changes therein and modifications thereof may be made, within the scope of the appended claim, without departing from the spirit of my invention or sacrificing its advantages.

Having fully described my invention, what I claim as new and desire to secure by Letters Patent, is:—

An artificial Christmas tree comprising a plurality of unitary sections and a supporting base, each section comprising a rigid trunk portion and a plurality of branches forming a unit with the trunk portion, said trunk portions being readily separable from and attachable to each other, and each unitary section of the tree also comprising a wiring system including electric lamp sockets and readily detachable and attachable electrical connections at the ends of the trunk portions, and the branches of each trunk portion being flexibly adjustable and attached at one end thereto so as to permit of their being collapsed toward the trunk portion for storage and shipping purposes, the upper ends of the trunk portions following the topmost section having identical connections and the lower ends of the trunk portions having identical connections, whereby each of the sections is adapted to be connected either to a succeeding unit or to the base to form a variable size tree.

In testimony that I claim the foregoing as my invention I have signed my name this 2nd day of April, 1926.

MARK HARRIS.